United States Patent [19]

Grass et al.

[11] 4,188,251

[45] Feb. 12, 1980

[54] METHOD OF DISPENSING LABELS

[75] Inventors: Joseph J. Grass, Kettering, Ohio;

[73] Assignee: Monarch Marking Systems, Inc., Dayton, Ohio

[21] Appl. No.: 881,972

[22] Filed: Feb. 27, 1978

Related U.S. Application Data

[62] Division of Ser. No. 758,296, Jan. 10, 1977, abandoned.

[51] Int. Cl.[2] .............. B32B 31/18

[52] U.S. Cl. .............. 156/248; 40/2 R; 156/249; 156/250; 156/253; 156/268; 156/277; 156/344; 428/42; 428/43; 428/48

[58] Field of Search .............. 156/247, 248, 249, 250, 156/253, 257, 268, 271, 291, 344, 277; 428/40-43, 48, 352; 40/2 R

[56] References Cited

U.S. PATENT DOCUMENTS

| | | | |
|---|---|---|---|
| 2,121,865 | 6/1938 | Flood | 40/2 R |
| 2,303,346 | 12/1942 | Flood | 156/268 |
| 3,703,044 | 11/1972 | Gregory | 428/43 X |
| 3,820,261 | 6/1974 | Beall, Jr. | 40/2 R |
| 3,968,745 | 7/1976 | Hamisch, Jr. | 156/384 X |

FOREIGN PATENT DOCUMENTS

| | | | |
|---|---|---|---|
| 2050035 | 6/1969 | France | 428/42 |

*Primary Examiner*—Michael G. Wityshyn
*Attorney, Agent, or Firm*—Joseph J. Grass

[57] ABSTRACT

There is disclosed a composite web of pressure sensitive labels and method of making and using same. The composite web has a web of supporting material and a series of two-part labels releasably secured by pressure sensitive adhesive to the supporting material web. One part of the label is detachably connected to the other part by a line of partial severing. The adhesive is preferably coated onto only the one label part and the other label part is preferably free of adhesive. The label parts that are adhesive-free are detachably connected to each other by frangible portions which prevent the adhesive-free label parts from moving away from the supporting material web until the labels are delaminated from the supporting material. There is also disclosed method of making such composite webs and method of using such composite webs in label printing and applying machines.

16 Claims, 9 Drawing Figures

METHOD OF DISPENSING LABELS

CROSS-REFERENCE TO RELATED APPLICATION

This application is a division of application Ser. No. 758,296 filed Jan. 10, 1977, now abandoned.

BACKGROUND OF THE INVENTION

1. Field of the Invention

The invention relates to composite webs of pressure sensitive labels, to method of making such webs and to method of using such webs.

2. Brief Description of the Prior Art

It is known in the United States to have two-part labels carried on a web of supporting material in which the labels are completely severed from each other, in which one of the labels parts of each label is releasably secured to the supporting material web and the related label part is free of adhesive. The two label parts are joined at a line of weakening or partial severing. The adhesive on the one label parts releasably secures the labels to the web. Such labels are often used as "sale labels" in which the regular price is marked on the label part with the adhesive and the sale price is marked on the label part without the adhesive. The label is removed from the web and adhered to merchandise and the customer is thus aware of both the regular price and the sale price. When the sale is over the clerk removes the other label part, that is, the label part with the sale price, and only the label part with the regular remains adhered to the merchandise. In such a two-part label, the label part without the adhesive causes problems in manufacturing (especially when the wide composite web is slit into narrow composite label webs), in handling, and in feeding the composite web in marking machines such as a hand-held label printing and applying machine. These problems arise because the adhesive-free part tends to move away from the supporting material web as it pivots about the line of partial severing which divides the label into two parts. The adhesive-free parts act like loose flaps. The flaps can for example pivot through 180° and overlie the part which is secured to the web by means of adhesive. For example, the flap can become torn or mutilated inside the label printing and applying machine, causing label waste or incomplete printing of the label. When applying two-part labels of this type, especially labels that are relatively wide, there is a tendency for the label to be applied to certain merchandise in a skewed orientation because of the fact that only the regular price label part was adhesive. This is the case especially where merchandise has a surface characteristic to which it is difficult to apply a pressure sensitive label, for example, a wet, waxy or oily surface.

One of the attempts in the United States to overcome these problems has been to provide a wide web of supporting material to which a wide web of label material is releasably secured by pressure sensitive adhesive. The label material is provided with laterally spaced longitudinally extending zones of pressure sensitive adhesive. The wide web is partially severed longitudinally at one edge of each zone, the label material is severed laterally at longitudinally spaced locations, the lateral severing being complete, and the wide composite web is completely severed longitudinally through marginal portions of the adhesive zones to produce composite webs of two-part labels in which one (or regular price) label part had a wide zone of adhesive and the other (or sale price) label part has a narrow zone of adhesive at its one marginal edge. In that both label parts are releasably secured to the supporting material web by pressure sensitive adhesive there are no loose flaps. However, solving the problem of the loose flaps in this manner causes other problems. For instance, because the sale label part has an adhesive coating which is just as thick as the regular price label part, care must be taken to keep the adhesive zone on the sale label part precisely the proper (narrow) width to prevent the sale label part from adhering too tenaciously to the merchandise to which it is to be applied. In that the adhesive on both label parts is of the same composition, namely of a type known in the art as "permanent" adhesive, it is apparent that too much permanent adhesive on the sale label part is very problemsome. In addition when making a two-part label in this manner, the adhesive stripe or zone on the sale label part extends to its very outer edge and this makes it more difficult to remove by the clerk after the conclusion of the sale because the sale label part is held down to the merchandise to the very edge of the sale label part and it is difficult to get a hold of it. In addition, because the sale label part has adhesive on it, a customer can switch a sale label part (of one label) which bears a low price with a sale label part (of another label) and thus make it appear as if the higher priced merchandise is actually on sale at a lower price. Moreover, the sale label part is sticky to the touch and tends to adhere to the fingers when it is grasped.

It is also known in the United States to provide a composite web of completely severed two-part labels in which the one or regular price label part has a wide zone of adhesive and the other or sale label part has a narrow zone of adhesive in which the adhesive on the sale label part is substantially thinner than the adhesive on the regular price label part. The two-parts of each label are detachably connected by a line of partial severing. The adhesive in both zones can be of the same composition. With certain merchandise even minimal amounts of adhesive can be detrimental because the sale parts adhere too securely to such merchandise. Such two-part labels are completely severed from each other in one version and are partially severed so incompletely in another version to require the two-part labels to be severed from each other by a cut-off knife.

It is also known in the United States to provide a composite web of completely severed two-part labels in which one label part is releasably adhered to a supporting material web by means of a coating of a permanent-type adhesive and in which the other label part is releasably adhered to the web by means of a coating of a removable-type adhesive. Thus, both parts are releasably adhered to the supporting material web. Such composite label webs are made using a wide composite label web in which the label material is coated with two types of adhesives in an alternating pattern, and the wide composite web is subsequently slit to make narrower composite label webs each having a zone of permanent-type adhesive and a zone of removable-type adhesive. However, the cost of making a composite web in which the label material was coated with two different types of adhesive made it unattractive for use as a sale label. Moreover, the holding power or tackiness of the removable-type adhesive on the removable label part made such a two-part label impractical for use as a sale label because even a removable-type adhesive applied in conventional amounts and distribution adheres tenaciously enough to many types of merchandise to which price labels are generally applied to prevent quick removal. Moreover, because the other label part has (removable) adhesive it is subject to being switched and it is sticky to the touch.

It is also known in the United States to provide a composite label web of the three-part type in which the label has two outboard label parts which are releasably secured to a web of supporting material and an inboard label part free of adhesive which is removably secured to the outboard label parts by respective lines of partial severing. In this connection reference is made to U.S. Pat. No. 3,885,334 to James P. Banks dated May 27, 1975.

U.S. Pat. No. 3,551,251 to Yo Sato et al dated Dec. 29, 1970 discloses a label printing and applying machine in which a knife is used to separate labels from each other.

It is also known in the United States to provide a composite web of two-part labels in which the one label parts which are free of adhesive and the other label parts have pressure sensitive adhesive releasably securing the labels to a web of supporting material, wherein the label parts of each label are lightly detachably connected and wherein adjacent labels are connected to each other at both label parts relatively securely. While these labels are not suitable for use in a label printing and applying apparatus which does not have a knife for severing adjacent labels, the labels can be manually separated from the web with the label parts of each label still connected and thereafter the labels can be torn apart and individually applied to merchandise.

U.S. Pat. No. 3,767,039 to Schroter dated Oct. 23, 1973 discloses a tape composed of several segments, coated on both sides with a pressure sensitive adhesive. The tape is connected but has easily separable sticker segments arranged on the carrier tape. With this kind of tape structure the result is obtained that a segment pulled off from the carrier tape draws the following segment after it is up to the point of tearing away. The tape with connected but readily separable segments lends itself particularly well to use in dispensing apparatus in which the composite tape is pulled off the supply roll and the carrier tape is pulled around a reversing vane, whereby the segment reaching this position lifts off the carrier type as the latter is folded back on itself. By a slight pull this segment is then torn away from the following one that still more or less completely adheres to the carrier tape.

SUMMARY OF THE INVENTION

The invention relates to method of dispensing labels from a composite web which has the advantages of prior art two-part pressure sensitive labels without their disadvantages. The composite web according to a preferred embodiment has a longitudinally extending web of supporting material with a release coating. The label material is printable with indicia and has pressure sensitive adhesive releasably adhering it to the release coating on the supporting material web. There is a longitudinally extending line of partial severing in the label material between its side edges and there are longitudinally spaced laterally extending lines of severing in the label material to provide a series of labels carried on the supporting material web, and each label has first and second label parts. Only the first label parts have a coating of the adhesive in an amount and distribution to hold the first label parts securely to merchandise. It is preferable to have the second label parts free of adhesive. Longitudinally spaced lateral lines of severing are incomplete to provide frangible portions to prevent the second label parts from moving away from the supporting material web so long as the respective first label parts are adhered to the supporting material web. The frangible portion thus prevents the second label parts from being loose flaps. However, the frangible portion enables a label which is to be applied to be readily pulled apart from the next adjacent label during application of a label. The longitudinal partial severing holds the first and second label parts to each other relatively securely to prevent the second label part from being accidentally detached from the related first label part until ready to be detached and removed by the user. The force required to pull apart adjacent labels is less than the force required to pull apart related first and second label parts. It is preferred that the frangible portions be only at the second label parts.

The composite web described above is preferably made from a composite web or laminate in which the label material is provided with laterally spaced longitudinally extending zones of adhesive wherein the intervening zones are preferably free of adhesive. The label material of the wide composite web is partially severed longitudinally adjacent one side edge of each adhesive zone, and the label material is severed laterally at longitudinally spaced intervals but the severing is incomplete at least at the second label parts. It is preferred that the severing is complete at the first label parts but incomplete only at the second label parts. Both the label material and the supporting material web are severed adjacent the other edges of the adhesive zones. The longitudinal severing and the lateral incomplete severing is such that the force required to pull apart labels is less and preferably substantially less than the force required to pull apart related first and second label parts. According to the method of using the above-mentioned composite label web, there is provided a method comprising printing indicia on both the first and second label parts. When using the invention as a sale label, the first label part is imprinted with the regular price and the second label part is imprinted with the sale price. The supporting material web is thereafter drawn around a relatively sharp bend until the just printed label part is advanced to a position at which only a trailing marginal end portion is adhered to the supporting material web and the label is in label applying relationship with respect to a label applicator. The label is applied using the label applicator while pulling the trailing marginal end portion of the label away from the supporting material web and simultaneously pulling and thereby tearing the frangible portion which connects the label which is being applied to the next adjacent label. The second label part can thereafter be detached from the first label part by the user. It is preferred to use the composite label web of the invention to a hand-held label printing and applying apparatus in which the label is printed and thereafter dispensed directly to label applying position relative to the label applicator, and moving the machine so that the applicator presses the dispensed label onto the merchandise and pulls the label from the supporting material web and pulls the label apart from the adjacent label to which it is connected by means of the frangible portion.

DETAILED DESCRIPTION OF THE PREFERRED EMBODIMENTS

Figure 1:
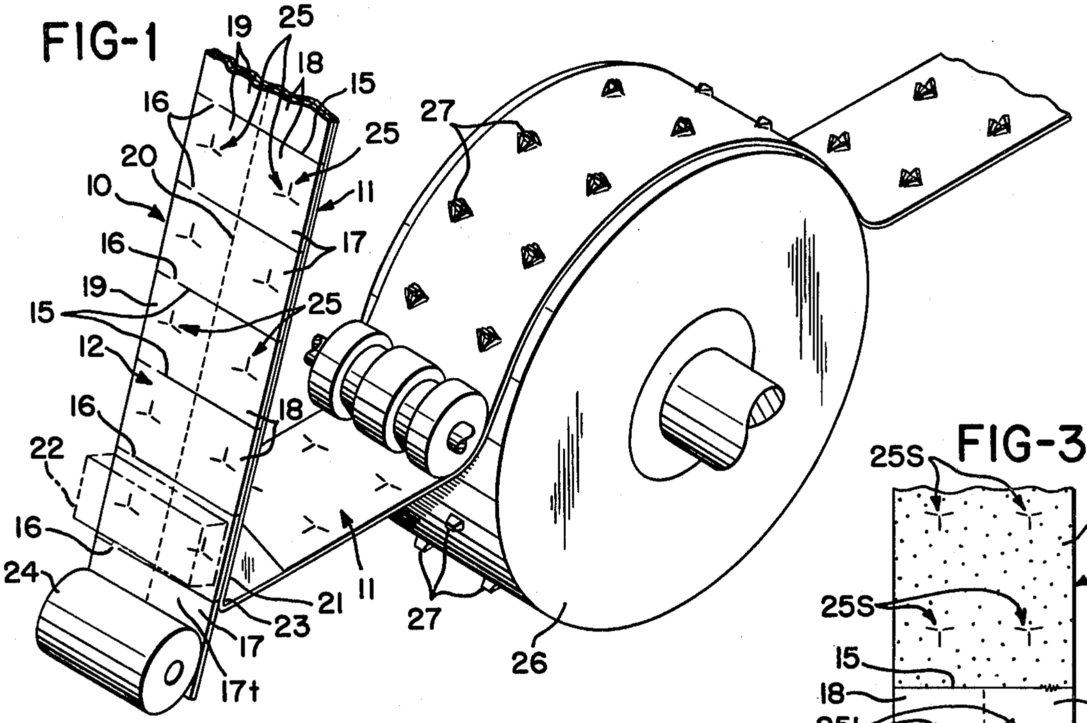
FIG. 1 is a perspective diagrammatic view showing the manner in which a composite web of pressure sensitive labels is shown in relationship to a print head, a delaminator, an applicator and a toothed feed wheel.
Figure 3:
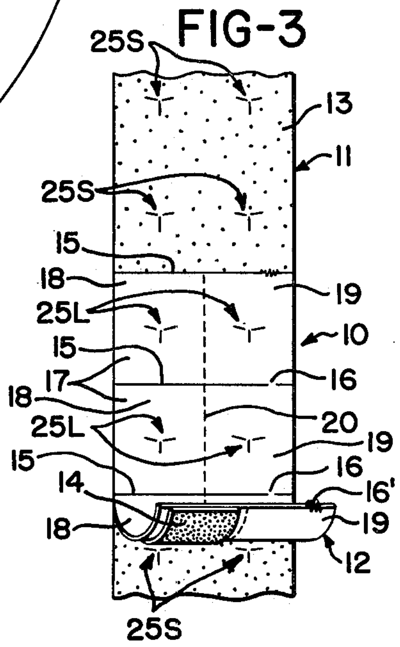
FIG. 3 is a top plan view of the composite web with some of the label material removed to show the supporting material web.
Figure 4:
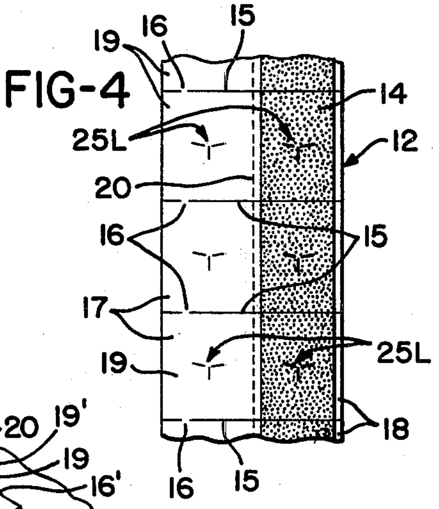
FIG. 4 is a bottom plan view of the label material.
Figure 6:
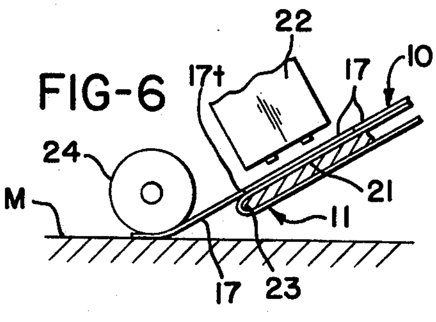
FIG. 6 is a diagrammatic view showing the manner in which the label is disposed relative to the applicator and to the delaminator at the beginning of the label application.

Referring to FIGS. 1 and 3 initially, there is shown a composite web generally indicated at 10 which includes a web of supporting material generally indicated at 11 and label material generally indicated at 12. The supporting material has a release coating 13 indicated by light stippling in the drawings. The label material 12 is shown to have a stripe or zone of adhesive 14 indicated by heavy stippling. The adhesive 14 releasably adheres the label material 12 to the release coating 13 on the web 11. The label material is severed laterally as indicated at 15 except for lands or frangible portions 16. The severing 15 divides the label material 12 into a series of labels 17 which are detachably connected by the frangible portions 16. The labels 17 are divided into label parts 18 and 19 by a line of partial severing 20. Each frangible portion 16 is shown to include only one interruption in the severing 15 as is preferred but it can include more than one interruption. The frangible portion 16 is preferably made by failing to cut the label material 12, but it can be made by scoring or creasing the label material 12. It is preferred that the frangible portions 16 be made only at the label parts 19 as shown. It is also preferred to have the adhesive 14 only at the underside of the label part 18 so that the label part 19 is free of adhesive. The partial severing 20 is preferably made by perforation cuts which extend entirely through the label material 12 but leave intervening lands or frangible portions as shown in the drawings, however, the expression partial severing, as used herein, includes scoring and/or creasing. The frangible portions 16 prevent the label parts 19 from moving away from the supporting material web 11, as by pivoting about partial severing 20 or as by curling, so long as the respective label parts 18 are adhered to the supporting material web by means of the adhesive 14. The frangible portions 16 are, however, sufficiently weak to enable a label 17 which is being applied (FIGS. 1, 6 and 7) to be readily pulled apart from the next adjacent label. The partial severing 20 holds the label parts 18 and 19 to each other relatively securely to prevent the label part 19 from being accidentally detached from the related label part 18 until ready to be detached and removed by the user. The partial severing 20 leaves the label parts 18 and 19 attached more securely than the frangible portions 16 attach adjacent labels, thus the force required to pull adjacent labels 17 apart from each other is less and most preferably substantially less than the force required to pull apart label parts 18 and 19.

Figure 2:
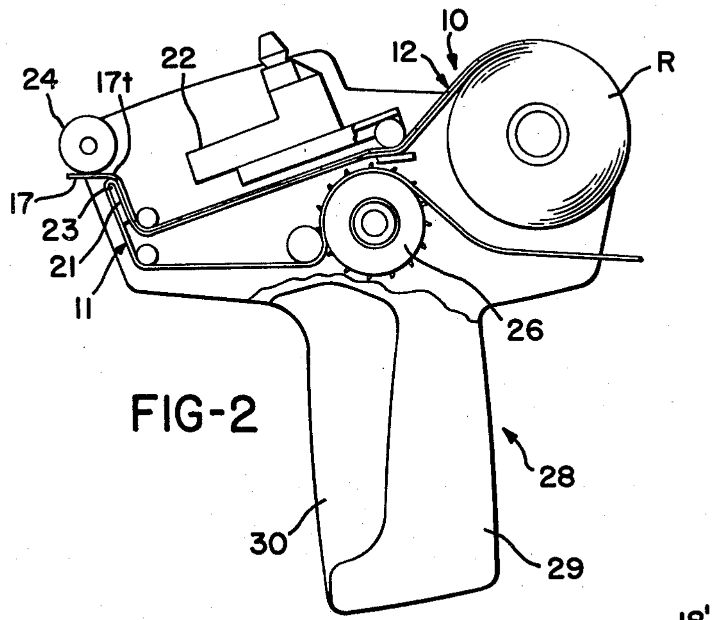
FIG. 2 is a side elevational view of a composite web of labels according to the invention in use in a hand-held label printing and applying apparatus.
Figure 5:
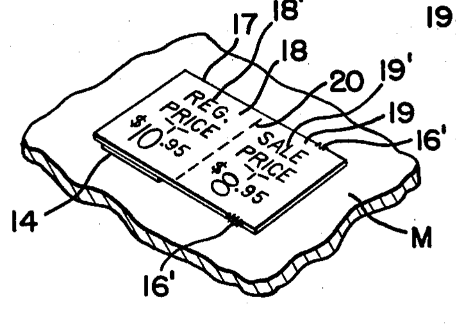
FIG. 5 is a perspective view showing a label according to the invention applied to merchandise.
Figure 7:
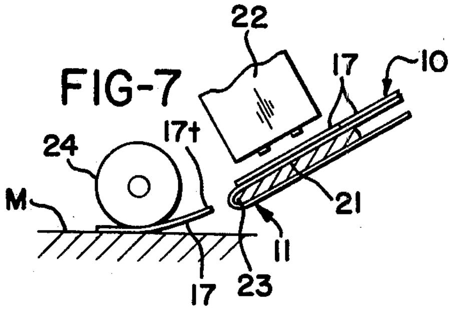
FIG. 7 is a view similar to FIG. 6 but showing the leading label as having been pulled from the supporting material web and as having been torn from the next successive label.

FIG. 1 shows diagrammatically the manner in which the composite web 10 is used. The composite web 10 is advanced to a platen 21 with which a print head 22 shown diagrammatically by phantom lines in FIG. 1 is cooperable. A delaminator 23 is disposed adjacent or at the terminal end of the platen 21, and an applicator 24 shown to be in the form of a roll is shown in label applying relationship with respect to the leading label 17. The composite web has groups of cuts 25 shown to be arranged in two columns. The cuts 25 are shown to be in both the label material 12 and the supporting material web 11. The cuts in the label material 12 are indicated at 25L and the cuts in the supporting material are indicated at 25S. A toothed driver 26 is specifically shown to be a feed wheel with teeth 27. The teeth 27 break through the supporting materil web 11 at cuts 25S and when the driver 26 is rotated clockwise (FIGS. 1 and 2) the composite web is advanced, thereby drawing the web 11 about the delaminator 23 and advancing the labels 17. The composite web 10 can be used in commercially available hand-held label printing and applying apparatus sold by Monarch Marking Systems, Inc., Dayton, Ohio U.S.A. as illustrated in their U.S. Pat. No. 3,957,562 granted on May 18, 1976 to Paul H. Hamisch, Jr. FIG. 2 of the drawings of the present application shows the composite web in a labeler 28, the precise construction of which is better illustrated in their U.S. Pat. No. 3,948,172 granted on Apr. 6, 1976 to Paul H. Hamisch, Jr. The composite web 10 is shown to comprise a roll R from which the free end portion is paid out. The composite web 10 is guided to the platen 21 and from there the web 11 passes to the toothed driver 26. The label 17 is first printed by the print head 22 and thereafter advanced by the toothed driver 26. As shown in FIG. 2 and as better shown in FIG. 6 when the composite web 10 is fully advanced following printing, the leading label 17 is at a position at which its trailing marginal end portion 17*t* is still adhered to the supporting material web 11. The apparatus 28 has a handle 29 at which an actuator 30 is disposed. The user grasps the handle 29 and the actuator 30 in one hand and upon squeezing the actuator 30 the print head 22 moves into cooperation with the platen 21 and when the user releases the actuator 30 return spring means (not shown) effects movement of the print head 22 away from the platen 21 and effects clockwise rotation of the toothed driver 26. The user applies the label 17, which has been dispensed into label applying position with respect to applicator 24, by causing the label to be pressed by means of the applicator 24 against the surface of the merchandise M. The user moves the apparatus 28 so that the applicator 24 pulls the trailing marginal end portion 17*t* of the label 17 away from the supporting material web 11 and pulls the label 17 apart from the adjacent label 17 to which it is connected by means of the frangible portion 16, thereby separating the leading label 17 from the supporting material web 11 and from the next adjacent label 17 as shown in FIG. 7. FIG. 5 shows the label 17 applied to merchandise M by means of the adhesive 14. The ruptures 16′ at the frangible portions 16 are indicated in FIG. 5, for example. The user can tear the label part 19 from the label part 18 at line 20 of partial severing.

The label 17 is preferably printed with indicia 18′ for example "Reg. Price" on label part 18 and indicia 19′ for example "Sale Price" on label part 19. The indicia 18′ and 19′ have been omitted from FIGS. 1, 3, and 9 for clarity but each label part 18 and 19 would be printed with these respective indicia. The user sets the print head 22 to print both the regular price and the sale price, and it is apparent that the regular price is higher than the sale price. When the sale is over, the clerk simply tears off the label part (or sale label part) 19 and the label part (or regular price label part) 18 remains securely adhered to the merchandise by the adhesive 14. It is apparent that only the label part 18 of each label has a coating of the adhesive 14 in an amount and distribution to hold the label 17 securely to the merchandise M. The label part 19 does not have adhesive in an amount and distribution to hold the label part 19 securely to the merchandise M, and preferably the label parts 19 are entirely free of adhesive.

Figure 8:
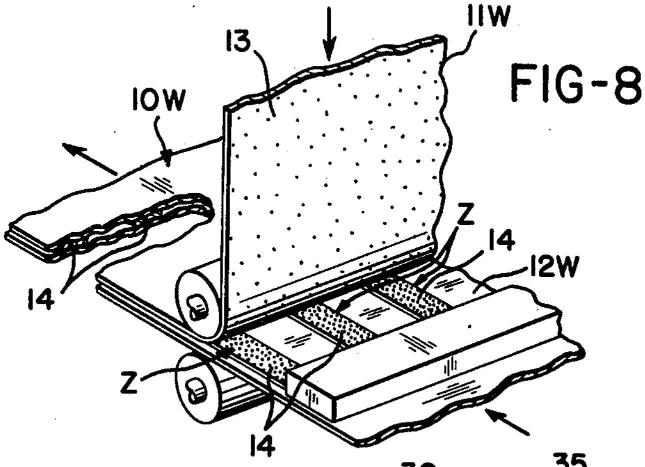
FIG. 8 is a fragmentary perspective view showing lamination of a wide web of supporting material to a wide web of pattern gum label material.
Figure 9:
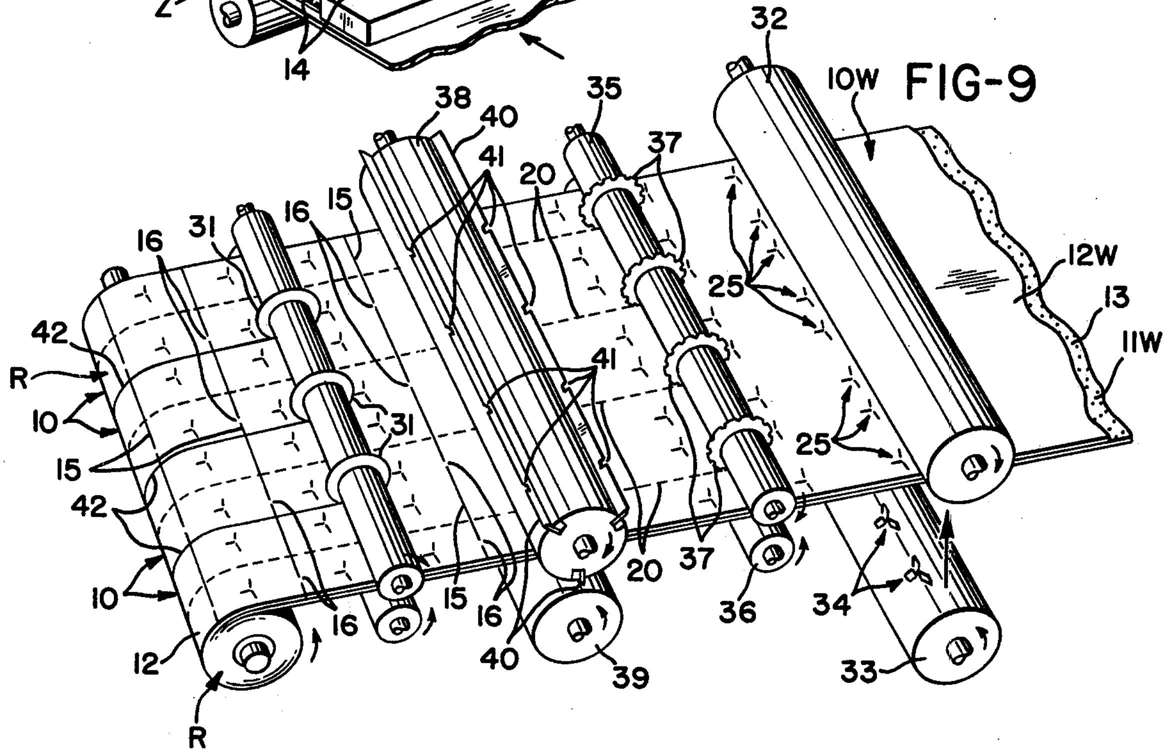
FIG. 9 is a diagrammatic view showing how composite webs in accordance with the invention are made.

With reference to FIG. 8, a wide composite web 10W is made by laminating a wide web of supporting material 11W to a wide web of label material 12W. The web 11W has a release coating 13 and the web 12W has laterally spaced zones of the adhesive 14. The zones Z are spaced apart by intervening zones which are preferably free of adhesive as shown. The wide composite web 10W can be processed into the composite webs 10 in high speed rotary presses. FIG. 9 is a greatly simplified diagrammatic representation of such a press. In such presses the web moves at high speed along both straight and curvilinear lines and without the frangible portions 16 the label parts 19 would fold outwardly once the web 10W is slit by knives 31 into relatively narrow composite webs 10. As shown the web 10W is provided with cuts 25 by cooperating rolls 32 and 33. The roll 33 is provided with knives 34. The web 10W passes between cooperating rolls 35 and 36. The roll 35 has laterally spaced perforating knives 37 which make the lines of partial severing 20. The knives 37 preferably do not make perforation cuts into or through the supporting material web 11W. The web 10W also passes between rolls 38 and 39. The roll 38 has knives 40 which make the lateral lines of severing 15. The knives 40 preferably do not make any cut into or through the supporting material web 11W. The knives 40 have notches 41 which form the lands or frangible portions 16. Following slitting of the web 10W, that is, both the label material web 12W and the supporting material web 11W by knives 31 along lines of severing 42, the composite webs 10 can be wound into rolls R which can be used in the apparatus 28.

It is preferred that adjacent labels 17 can be separated from each other more easily than related label parts 18 and 19 can be separated from each other. More specifically the force required to pull apart labels 17 should be large enough to prevent the loose flap problem but small enough to enable the leading label 17 to be pulled apart from the adjacent label 17 during application of the leading label 17 to the merchandise M and the force required to pull apart label parts 18 and 19 should be large enough to prevent accidental tearing along the line of partial severing 20 when the label 17 is applied to merchandise M but small enough to enable the label parts 19 to be torn from the respective label parts 18 by the user while being applied using a label printing and applying machine. More preferably the force required to pull apart the labels 17 should be substantially less than the force required to pull apart label parts 18 and 19.

By way of example, not limitation, using label material which weighs 45 pounds per ream (a ream equals 475,000 square inches), a frangible portion 16 was about 0.028 inch long. A test of the force required to pull apart adjacent labels 17 by pulling at 180°, that is, in opposite directions averaged about 60 grams. Using partial severing 20 made by a cutter having 13 teeth per inch with each intervening land being 1/64th inch in length, the label length measured lengthwise of the partial severing 20 was 0.733 inch, the force required to pull apart label parts 18 and 19 by pulling at 180°, that is, in opposite directions, averaged about 1340 grams. In another example, when using a frangible portion 16 which was 0.041 inch in length, the force required to pull apart adjacent labels averaged about 415 grams. It is apparent that because of the nature of paper which comprises the label material 12, increasing the length of the land or frangible portion 16 greatly increases the force required to separate the labels 17. By way of example, not limitation, it is preferred when using label material of the 45 pounds per ream weight to have the length of the frangible portion be between about 0.020 inch and about 0.041 inch in length, it is preferred that the average pulling force required to separate labels 17 from each other be held below about 415 grams and most preferably in the range of about 50 grams to 200 grams, and it is preferred that the average force required to pull apart label parts 18 and 19 be held below about 2500 grams and more preferably to be held to between about 1100 and 1800 grams.

Other embodiments and modifications of this invention will suggest themselves to those skilled in the art, and all such of these as come within the spirit of this invention are included within its scope as best defined by the appended claims.

I claim:

1. Method of printing and applying labels of a composite web including a web of supporting material and pressure sensitive two-part labels having a coating of pressure sensitive adhesive releasably adhering the labels to the supporting material web, the two-part labels each having detachably connected first and second label parts with only the first label parts having the coating of pressure sensitive adhesive in an amount and distribution to hold the respective labels securely to merchandise, only the second label parts of adjacent labels being detachably connected together by a frangible portion, comprising the steps of: printing indicia on both the first and second label parts of a label, thereafter drawing the supporting material web around a relatively sharp bend until the just printed label is advanced to a position at which only a trailing marginal end portion is adhered to the supporting material web and the label is in label applying relationship with respect to a label applicator, and applying the label using the label applicator while pulling the trailing marginal end portion of the label away from the supporting material web and simultaneously pulling and thereby tearing the frangible portion which connects the label which is being applied to the next adjacent label.

2. Method of applying labels of a composite web including a web of supporting material and pressure sensitive two-part labels having a coating of pressure sensitive adhesive releasably adhering the labels to the supporting material web, the two-part labels each having detachably connected first and second label parts with only the first label parts having the coating of pressure sensitive adhesive in an amount and distribution to hold the respective labels securely to merchandise, only the second label parts of adjacent labels being detachably connected together by a frangible portion, comprising the steps of: drawing the supporting material web around a relatively sharp bend until a label is advanced to a position at which only a trailing marginal end portion is adhered to the supporting material web and the label is in label applying relationship with respect to a label applicator, and applying the label using the label applicator while pulling the trailing marginal end portion of the label away from the supporting material web and simultaneously pulling and thereby tearing the frangible portion which connects the label which is being applied to the next adjacent label.

3. Method of applying labels of a composite web including a web of supporting material and pressure sensitive two-part labels having a coating of pressure sensitive adhesive releasably adhering the labels to the supporting material web, the two-part labels each having detachably connected first and second label parts with only the first label parts having the coating of pressure sensitive adhesive in an amount and distribution to hold the respective labels securely to merchandise, only the second label parts of adjacent labels being detachably connected together by a frangible portion, comprising the steps of: drawing the supporting material web around a relatively sharp bend until a label is advanced to a position at which only a trailing marginal end portion is adhered to the supporting material web and the label is in label applying relationship with respect to a label applicator, the drawing step including engaging the supporting material web with a toothed driver downstream of the relatively sharp bend and advancing the toothed driver, and applying the label during the time the toothed driver is stationary using the label applicator while pulling the trailing marginal end of the label away from the supporting material web and simultaneously pulling and thereby tearing the frangible portion which connects the label which is being applied to the next adjacent label.

4. Method of using labels carried on a composite web including a web of supporting material and pressure sensitive two-part labels having a coating of pressure sensitive adhesive releasably adhering the labels to the supporting material web, the two-part labels each having detachably connected first and second label parts with only the first label part of each label having the coating of pressure sensitive adhesive in an amount and distribution to securely hold the respective label to merchandise, only the second label parts of adjacent labels being detachably connected together by a frangible portion, comprising the steps of: printing a first price on the first label part and a second and lower price on the second label part, drawing the supporting material web around a relatively sharp bend until the just printed label is advanced to a position at which only a trailing marginal end portion is adhered to the supporting material web and the label is in label applying relationship with respect to a label applicator, applying the label to merchandise using the label applicator while pulling the trailing marginal end portion of the label away from the supporting material web and simultaneously pulling and thereby tearing the frangible portion which connects the label which is being applied to the next adjacent label, and removing the second label part from the first label part by tearing the second label part apart from the first label part.

5. Method of printing and applying two-part labels carried on a web of supporting material using a hand-held label printing and applying apparatus, the apparatus having a print head, a delaminator, web advancing means, and a label applicator, the two-part labels each having detachably connected first and second label parts with only the first label part having a coating of a pressure sensitive adhesive in an amount and distribution to securely hold the respective label to the merchandise, only the second label parts of adjacent labels being detachably connected together by a frangible portion, comprising the steps of: manually grasping the label printing and applying apparatus and printing indicia on both the first and second label parts of a label and thereafter causing the web advancing means to draw the supporting material web around a relatively sharp bend until the just printed label is dispensed directly to label applying position relative to the label applicator at which the trailing marginal end portion of the label is still adhered to the supporting material web, and moving the apparatus so that the label applicator presses the dispensed label onto the merchandise and pulls the label from the supporting material web and pulls the label apart from the adjacent label to which it is connected by means of the frangible portion.

6. Method as defined in claim 5, including the step of tearing off and removing the second label part from the respective first label part after the label has been applied to merchandise.

7. Method of printing and applying labels of a composite web including a web of supporting material and pressure sensitive two-part labels and a coating of pressure sensitive adhesive releasably adhering the labels to the supporting material web, the two-part labels each having detachably connected first and second label parts with only the first label parts having the coating of pressure sensitive adhesive, with only the second label parts of adjacent labels being detachably connected together by a frangible portion, comprising the steps of: printing indicia according to the one price on the first label part of a label and according to a lower price on the respective second label part, thereafter drawing the supporting material web around a relatively sharp bend until the just printed label is advanced to a position at which only a trailing marginal end portion is adhered to the supporting material web and the label is in label applying relationship with respect to a label applicator, and applying the label using the label applicator while pulling the trailing marginal end portion of the label away from the supporting material web and simultaneously pulling and thereby tearing the frangible portion which connects the second label part of the label which is being applied to the second label part of the next adjacent label.

8. Method of using labels carried on a composite web including a web of supporting material and pressure sensitive two-part labels having a coating of pressure sensitive adhesive releasably adhering the labels to the supporting material web, the two-part labels each having detachably connected first and second label parts with only the first label part having the coating of pressure sensitive adhesive, only the second label parts of adjacent labels being detachably connected together by a frangible portion, comprising the steps of: printing a first price on the first label part and a second and lower price on the second label part, drawing the supporting material web around a relatively sharp bend until the just printed label is advanced to a position at which only a trailing marginal end portion is adhered to the supporting material web and the label is in label applying relationship with respect to a label applicator, applying the label to merchandise using the label applicator while pulling the trailing marginal end portion of the label away from the supporting material web and simultaneously pulling and thereby tearing the frangible portion which connects the second label part of the label which is being applied to the second label part of the next adjacent label, and thereafter tearing the second label part apart from the first label part.

9. Method of printing and applying labels of a composite web including a longitudinally extending web of supporting material having a release coating thereon and printable label material having pressure sensitive adhesive thereon, the adhesive being releasably adhered to the release coating on the supporting material web, the label material being severed at longitudinally spaced laterally extending lines to provide a series of labels carried on the supporting material web, the label material being partially severed along a longitudinally extending line between side edges of the label material to provide each label with first and second label parts with only the first label parts having a coating of the adhesive with the adhesive on the first label parts being present in an amount and distribution to hold the label securely to merchandise and the second label parts being connected to the supporting material web only through the longitudinally extending line of partial severing, wherein each line of lateral severing is substantially continuous and extends substantially completely across the entire width of the label material but defines a frangible portion connecting together the second label parts of adjacent labels for keeping the second label parts close to the supporting material web but enabling a label which is to be applied to be readily pulled apart from the next adjacent label during application of a label without knife cutting, comprising the steps of: printing indicia on both the first and second label parts of the label, thereafter drawing the supporting material web around a relatively sharp bend until the just printed label is advanced to a position at which only its trailing marginal end portion is adhered to the supporting material web and the label is in label applying relationship with respect to a label applicator, and applying the label using the label applicator while pulling the trailing marginal end portion of the label away from the supporting material web and simultaneously pulling and thereby tearing the frangible portion which connects the label which is being applied to the next adjacent label.

10. Method of applying labels of a composite web including a longitudinally extending web of supporting material having a release coating thereon and printable label material having pressure sensitive adhesive thereon, the adhesive being releasably adhered to the release coating on the supporting material web, the label material being severed at longitudinally spaced laterally extending lines to provide a series of labels carried on the supporting material web, the label material being partially severed along a longitudinally extending line between side edges of the label material to provide each label with first and second label parts with only the first label parts having a coating of the adhesive with the adhesive on the first label parts being present in an amount and distribution to hold the label securely to merchandise and the second label parts being connected to the supporting material web only through the longitudinally extending line of partial severing, wherein each line of lateral severing is substantially continuous and extends substantially completely across the entire width of the label material but defines a frangible portion connecting together the second label parts of adjacent labels for keeping the second label parts close to the supporting material web but enabling a label which is to be applied to be readily pulled apart from the next adjacent label during application of a label without knife cutting, comprising the steps of: drawing the supporting material web around a relatively sharp bend until a label is advanced to a position at which only its trailing marginal end portion is adhered to the supporting material web and the label is in label applying relationship with respect to a label applicator, and applying the label using the label applicator while pulling the trailing marginal end portion of the label away from the supporting material web and simultaneously pulling and thereby tearing the frangible portion which connects the label which is being applied to the next adjacent label.

11. Method of applying labels of a composite web including a longitudinally extending web of supporting material having a release coating thereon and printable label material having pressure sensitive adhesive thereon, the adhesive being releasably adhered to the release coating on the supporting material web, the label material being severed at longitudinally spaced laterally extending lines to provide a series of labels carried on the supporting material web, the label material being partially severed along a longitudinally extending line between side edges of the label material to provide each label with first and second label parts with only the first label parts having a coating of the adhesive with the adhesive on the first label parts being present in an amount and distribution to hold the label securely to merchandise and the second label parts being connected to the supporting material web only through the longitudinally extending line of partial severing, wherein each line of lateral severing is substantially continuous and extends substantially completely across the entire width of the label material but defines a frangible portion connecting together the second label parts of adjacent labels for keeping the second label parts close to the supporting material web but enabling a label which is to be applied to be readily pulled apart from the next adjacent label during application of a label without knife cutting, comprising the steps of: drawing the supporting material web around a relatively sharp bend until a label is advanced to a position at which only a trailing marginal end portion is adhered to the supporting material web and the label is in label applying relationship with respect to a label applicator, the drawing step including engaging the supporting material web with a toothed driver downstream of the relatively sharp bend and advancing the toothed driver, and applying the label during the time the toothed driver is stationary using the label applicator while pulling the trailing marginal end of the label away from the supporting web and simultaneously pulling and thereby tearing the frangible portion which connects the label which is being applied to the next adjacent label.

12. Method of using labels carried on a composite web including a longitudinally extending web of supporting material having a release coating thereon and printable label material having pressure sensitive adhesive thereon, the adhesive being releasably adhered to the release coating on the supporting material web, the label material being severed at longitudinally spaced laterally extending lines to provide a series of labels carried on the supporting material web, the label material being partially severed along a longitudinally extending line between side edges of the label material to provide each label with first and second label parts with only the first label parts having a coating of the adhesive with the adhesive on the first label parts being present in an amount and distribution to hold the label securely to merchandise and the second label parts being connected to the supporting material web only through the longitudinally extending line of partial severing, wherein each line of lateral severing is substantially continuous and extends substantially completely across the entire width of the label material but defines a frangible portion connecting together the second label parts of adjacent labels for keeping the second label parts close to the supporting material web but enabling a label which is to be applied to be readily pulled apart from the next adjacent label during application of a label without knife cutting, comprising the steps of: printing a first price on the first label part and a second and lower price on the second label part, drawing the supporting material web around a relatively sharp bend until the just printed label is advanced to a position at which only a trailing marginal end portion is adhered to the supporting material web and the label is in label applying relationship with respect to a label applicator, applying the label to merchandise using the label applicator while pulling the trailing marginal end portion of the label away from the supporting material web and simultaneously pulling and thereby tearing the frangible portion which connects the label which is being applied to the next adjacent label, and removing the second label part from the first label part by tearing the second label part apart from the first label part.

13. Method of printing and applying two-part labels from the composite label web using a hand-held label printing and applying apparatus, the apparatus having a print head, a delaminator, web advancing means, and a label applicator, the composite label web including a longitudinally extending web of supporting material having a release coating thereon and printable label material having pressure sensitive adhesive thereon, the adhesive being releasably adhered to the release coating on the supporting material web, the label material being severed at longitudinally spaced laterally extending lines to provide a series of labels carried on the supporting material web, the label material being partially severed along a longitudinally extending line between side edges of the label material to provide each label with first and second label parts with only the first label parts having a coating of the adhesive with the adhesive on the first label parts being present in an amount and distribution to hold the label securely to merchandise and the second label parts being connected to the supporting material web only through the longitudinally extending line of partial severing, wherein each line of lateral severing is substantially continuous and extends substantially completely across the entire width of the label material but defines a frangible portion connecting together the second label parts of adjacent labels for keeping the second label parts close to the supporting material web but enabling a label which is to be applied to be readily pulled apart from the next adjacent label during application of a label without knife cutting, comprising the steps of: manually grasping the label printing and applying apparatus and printing indicia on both the first and second label parts of a label and thereafter causing the web advancing means to draw the supporting material web around a relatively sharp bend until the just printed label is dispensed directly to label applying position relative to the label applicator at which the trailing marginal end portion of the label is still adhered to the supporting material web, and moving the apparatus so that the label applicator presses the dispensed label onto the merchandise and pulls the label from the supporting material web and pulls the label apart from the adjacent label to which it is connected by means of the frangible portion.

14. Method as defined in claim 13, including the step of tearing off and removing the second label part from the respective first label part after the label has been applied to merchandise.

15. Method of printing and applying labels of a composite web including a longitudinally extending web of supporting material having a release coating thereon and printable label material having pressure sensitive adhesive thereon, the adhesive being releasably adhered to the release coating on the supporting material web, the label material being severed at longitudinally spaced laterally extending lines to provide a series of labels carried on the supporting material web, the label material being partially severed along a longitudinally extending line between side edges of the label material to provide each label with first and second label parts with only the first label parts having a coating of the adhesive with the adhesive on the first label parts being present in an amount and distribution to hold the label securely to merchandise and the second label parts being connected to the supporting material web only through the longitudinally extending line of partial severing, wherein each line of lateral severing is substantially continuous and extends substantially completely across the entire width of the label material but defines a frangible portion connecting together the second label parts of adjacent labels for keeping the second label parts close to the supporting material web but enabling a label which is to be applied to be readily pulled apart from the next adjacent label during application of a label without knife cutting, comprising the steps of: printing indicia according to one price on the first label part of a label and according to a lower price on the respective second label part, thereafter drawing the supporting material web around a relatively sharp bend until the just printed label is advanced to a position at which only a trailing marginal end portion is adhered to the supporting material web and the label is in label applying relationship with respect to a label applicator, and applying the label using the label applicator while pulling the trailing marginal end portion of the label away from the supporting material web and simultaneously pulling and thereby tearing the frangible portion which connects the second label part of the label which is being applied to the second label part of the next adjacent label.

16. Method of using labels carried on a composite web including a longitudinally extending web of supporting material having a release coating thereon and printable label material having pressure sensitive adhesive thereon, the adhesive being releasably adhered to the release coating on the supporting material web, the label material being severed at longitudinally spaced laterally extending lines to provide a series of labels carried on the supporting material web, the label material being partially severed along a longitudinally extending line between side edges of the label material to provide each label with first and second label parts with only the first label parts having a coating of the adhesive with the adhesive on the first label parts being present in an amount and distribution to hold the label securely to merchandise and the second label parts being connected to the supporting material web only through the longitudinally extending line of partial severing, wherein each line of lateral severing is substantially continuous and extends substantially completely across the entire width of the label material but defines a frangible portion connecting together the second label parts of adjacent labels for keeping the second label parts close to the supporting material web but enabling a label which is to be applied to be readily pulled apart from the next adjacent label during application of a label without knife cutting, comprising the steps of: printing a first price on the first label part and a second and lower price on the second label part, drawing the supporting material web around a relatively sharp bend until the just printed label is advanced to a position at which only a trailing marginal end portion is adhered to the supporting material web and the label is in label applying relationship with respect to a label applicator, applying the label to merchandise using the label applicator while pulling the trailing marginal end portion of the label away from the supporting material web and simultaneously pulling and thereby tearing the frangible portion which connects the second label part of the label which is being applied to the second label part of the next adjacent label, and thereafter tearing the second label part apart from the first label part.

* * * * *